US006282178B1

(12) United States Patent
Noerpel et al.

(10) Patent No.: US 6,282,178 B1
(45) Date of Patent: Aug. 28, 2001

(54) PAGING RECEPTION ASSURANCE IN A MULTIPLY REGISTERED WIRELESS TRANSCEIVER

(75) Inventors: Anthony Noerpel, Lovettsville, VA (US); Xiaoping He, Germantown, MA (US)

(73) Assignee: Hughes Electronics Corp., El Segundo, CA (US)

( * ) Notice: Subject to any disclaimer, the term of this patent is extended or adjusted under 35 U.S.C. 154(b) by 0 days.

(21) Appl. No.: 09/115,101

(22) Filed: Jul. 13, 1998

Related U.S. Application Data
(60) Provisional application No. 60/052,443, filed on Jul. 14, 1997.

(51) Int. Cl.$^7$ .................................................. A63B 67/00
(52) U.S. Cl. .................... 370/316; 370/316; 370/327; 370/328; 370/330; 370/229; 370/341; 455/31.2
(58) Field of Search ...................................... 370/316, 330, 370/327, 329, 341, 328; 455/31.2

(56) References Cited

U.S. PATENT DOCUMENTS

| 5,245,634 | 9/1993 | Averbuch | 375/108 |
|---|---|---|---|
| 5,307,399 | 4/1994 | Dai et al. | 379/57 |
| 5,415,368 | 5/1995 | Horstein et al. | 244/158 |
| 5,551,058 | 8/1996 | Hutcheson et al. | 455/33.2 |
| 5,589,837 | 12/1996 | Soleimani et al. | 342/359 |

(List continued on next page.)

FOREIGN PATENT DOCUMENTS

| 0046831 | 3/1982 | (EP) | H04L/1/18 |
|---|---|---|---|
| 0162478 | 11/1985 | (EP) | H04L/1/18 |
| 0475698 | 3/1992 | (EP) | H04Q/7/04 |
| 0506255 | 9/1992 | (EP) | H04B/7/195 |
| 0637142 | 2/1995 | (EP) | H04B/7/185 |

(List continued on next page.)

OTHER PUBLICATIONS

Garg, et al., "Cost Effective Personal Communications Using Geo–Synchronous Satellite", 1996 IEEE International Conference on Personal Wireless Communications Proceedings and Exhibition—Future Access (CAT. No. 96TH8165), 1996.

Fingerle et al., "GSM Signalisierung in der Praxis", ITG–Fachbericht, pp. 423–432, No. 124, Sep. 1993.

Johnny N. Ku, "Strategies on the Immediate Assignment Procedure Within the GSM Call Setup Scenario", pp. 786–789, IEEE, 1992.

Annoni et al., "Access and Synchronization Schemes in the ESA OBP System", Countdown to the New Millennium, Phoenix, pp. 206–211, Dec. 2, 1991, IEEE.

*Primary Examiner*—Ajit Patel
*Assistant Examiner*—Thien Tran
(74) *Attorney, Agent, or Firm*—John T. Whelan; Michael W. Sales

(57) ABSTRACT

An approach for selecting an asynchronous paging interval involves selecting a set of possible paging schemes for one wireless system; selecting a paging interval for another wireless system that is asynchronous with the paging schemes selected for the one wireless system; determining, after some number of paging repetitions, the probability of collision between a first paging channel in the one wireless system, and a second paging channel in the other wireless system; reselecting the paging interval for the other wireless system, asynchronous with the paging schemes selected for the one wireless system, and repeating the determining of the probability, until after some number of page repetitions, the probability reaches a prescribed minimum; and reselecting the paging interval for the other wireless system, asynchronous with the paging schemes selected for the one wireless system, and repeating the determining of the probability, until the number of paging repetitions needed to reach the prescribed minimum is reaches a selected minimum.

10 Claims, 2 Drawing Sheets

U.S. PATENT DOCUMENTS

| | | | | |
|---|---|---|---|---|
| 5,619,525 | * | 4/1997 | Wiederman et al. | 375/200 |
| 5,630,016 | | 5/1997 | Swaminathan et al. | 395/2.37 |
| 5,678,228 | | 10/1997 | Soeimani et al. | 455/343 |
| 5,689,568 | | 11/1997 | Laborde | 380/49 |
| 5,706,329 | | 1/1998 | Foladare et al. | 379/57 |
| 5,710,982 | | 1/1998 | Laborde et al. | 455/69 |
| 5,717,686 | | 2/1998 | Schiavoni | 370/321 |
| 5,745,524 | | 4/1998 | Hull | 375/244 |
| 5,752,187 | * | 5/1998 | Frank et al. | 455/428 |
| 5,758,256 | | 5/1998 | Berry et al. | 455/72 |
| 5,765,098 | | 6/1998 | Bella | 455/13.3 |
| 5,781,540 | | 7/1998 | Malcolm et al. | 370/321 |
| 5,790,939 | | 8/1998 | Malcolm et al. | 455/13.2 |
| 5,794,160 | | 8/1998 | Eauriko | 455/557 |
| 5,812,538 | * | 9/1998 | Wiederman et al. | 370/316 |
| 5,812,545 | | 9/1998 | Liebowitz et al. | 370/337 |
| 5,881,101 | | 3/1999 | Furman et al. | 375/217 |
| 5,920,284 | | 7/1999 | Victor | 342/357.01 |
| 5,940,753 | | 8/1999 | Mallinckrodt | 455/422 |
| 5,943,606 | | 8/1999 | Kremm et al. | 455/12.1 |
| 5,956,646 | | 9/1999 | Kolev et al. | 455/502 |
| 5,966,662 | | 10/1999 | Murto | 455/458 |
| 5,987,319 | | 11/1999 | Hermansson et al. | 455/422 |
| 5,991,642 | | 11/1999 | Watanabe et al. | 455/560 |
| 6,115,366 | * | 9/2000 | Campanella et al. | 370/319 |
| 0662758 | | 7/1995 | (EP) | H04B/7/185 |
| 0663736 | | 7/1995 | (EP) | H04B/7/185 |
| 0668667 | | 8/1995 | (EP) | H04B/7/26 |
| 0748064 | | 12/1996 | (EP) | H04B/7/185 |
| 04045617 | | 2/1992 | (JP) | H04B/1/38 |
| 8607512 | | 12/1986 | (WO) | H04B/7/185 |
| 9102436 | | 2/1991 | (WO) | H04Q/7/04 |
| 9612352 | | 4/1996 | (WO) | H04B/1/40 |
| 9718650 | | 5/1997 | (WO) | H04L/1/08 |
| 9723065 | | 6/1997 | (WO) | H04B/7/185 |
| 9724891 | | 7/1997 | (WO) | H04Q/7/22 |
| 9839857 | | 9/1998 | (WO) | H04B/7/185 |

* cited by examiner

PAGING RECEPTION ASSURANCE IN A MULTIPLY REGISTERED WIRELESS TRANSCEIVER

This application claims priority to U.S. provisional Patent Application Ser. No. 60/052,443, of Roos, et al., filed Jul. 14, 1997, for Common Air Interface, the entire contents of which are hereby incorporated by reference.

This patent document relates to a common air interface described in a series of patent documents filed concurrently herewith. Related patent documents are: U.S. patent application Ser. No. 09/115,102, filed Jul. 13, 1998, of Soleimani, et al., for Signaling Maintenance for Discontinuous Information Communications; U.S. patent application Ser. No. 09/115,098, filed Jul. 13, 1998, of Joshi, et al., for System and Method for Implementing Terminal-To-Terminal Connections Via a Geosynchronous Earth Orbit Satellite; U.S. patent application Ser. No. 09/115,097, filed Jul. 13, 1998, of Roos, et al., for Mobile Satellite System Having an Improved Signaling Channel; U.S. patent application Ser. No. 09/115,096, filed Jul. 13, 1998, of Noerpel, et al., for Spot Beam Selection in a Mobile Satellite Communication System; U.S. patent application Ser. No. 09/115,095, filed Jul. 13, 1998, of Joshi, et al., for Immediate Channel Assignment in a Wireless System; U.S. patent application Ser. No. 09/115,099, filed Jul. 13, 1998, of Joshi, et al., for Error and Flow Control in a Satellite Communications System; and U.S. patent application Ser. No. 09/115,100, filed Jul. 13, 1998, of Roos, et al., for Synchronization of a Mobile Satellite System with Satellite Switching, all of which are incorporated herein by reference.

BACKGROUND OF THE INVENTION

The present invention relates to paging reception assurance in a multiply registered (multihomed) wireless transceiver, and more particularly to assuring reception of pages in a multiply registered wireless transceiver wherein page receipt must be guaranteed on at least one system with which the transceiver is registered. Even more particularly, the present invention relates to assuring paging reception in a multiply registered wireless transceiver wherein page receipt must be guaranteed in at least one system having a plurality of paging schemes with which the transceiver is registered.

Great advances in the field of wireless communications have been made over the past ten to twenty years, and continues to be made. These advances both improve the quality of communication, e.g., the clarity and reliability of communication, and improve the geographic coverage of such wireless communications. As industry strives to provide a wireless communications capability that covers the entire globe, factors such as economic viability dictate that space-based transceivers be employed as opposed to ground infrastructure based on cellular (including personal communications services, PCS). Ground-base infrastructure, however, remains technologically advantageous and economically preferable in identified population centers where a great deal of bandwidth is required in a relatively small area. Thus, two types of wireless communication, i.e., ground infrastructure cellular, and space-based satellite systems have emerged.

In addition, different regions of the world have adopted different wireless communication standards, and subscriber units, i.e., wireless transceivers, designed to function in one standard will generally not function in another, at least simultaneously. In regions serviced by more than one standard, it may be advantageous to maintain service on multiple systems, under multiple standards, simultaneously, for maximum reachability, especially in fringe areas and/or when the multiple systems do not cooperate with one another to deliver page messages to the wireless transceiver. These multiple systems may be entirely earth based, may be a combination of earth and satellite based, or may be entirely satellite based.

In order to comply with some existing standards, such as the Global System for mobile telecommunications (GSM), a subscriber unit must be compliant with the standards. Problematically, existing standards may not be designed to cooperate with one another. For example, the GSM requires that a wireless transceiver not miss a GSM page message when in idle mode, and when registered with a GSM network. At the same time, however, the wireless transceiver should not miss pages from other systems with which it is operating simultaneously.

It is expected that each system with which a wireless transceiver operates will maintain a paging schedule within respective broadcast control channels (BCCH), however, each broadcast control channel is independent and asynchronous in time, thus preventing the wireless transceiver from knowing in advance when to schedule monitoring for paging messages at each control channel. Furthermore, the wireless transceiver should only be expected to monitor one broadcast control channel at a time, because processors and other hardware within the wireless transceiver may be shared by each of the systems on which the wireless transceiver operates, thus making simultaneous monitoring on two or more wireless systems impossible.

In the case of GSM, the situation is further complicated by the fact that GSM has a large number of schemes (or paging schedules) for organizing its paging message broadcasts within its broadcast control channel, and by the fact that, in the case where a GSM system is to be employed in conjunction with a satellite-based system, a single satellite spot beam or paging area may encompass many GSM cell sites, all of which may be operating under different and asynchronous paging schedules.

Coordination of paging on two or more simultaneously registered wireless systems, is further complicated by the fact that a large number of subscriber units are battery powered, and therefore maximizing, "sleep mode" time, where little or no battery current is drawn, is highly desirable. Thus, a paging schedule is generally employed by the subscriber unit in order to define those periods during which the subscriber will monitor a paging channel for a page. Outside of these times, the wireless transceiver may shut down, and therefore be unresponsive to pages. Thus, the wireless transceiver must know in advance of any page messages being sent, the time periods, for each system it is monitoring, during which a page message can potentially be transmitted by the respective system.

In accordance with the GSM system, and similar systems, the paging channel may be expanded for one or more frames by the addition of a paging channel extension bit. In the case of GSM, the paging channel extension bit tells the affected wireless transceiver to monitor the "next but one" paging channel within the GSM broadcast control channel. While this extension capability allows minimization of the number of paging channels that need to be monitored by a subscriber unit on an on-going basis, and thus improvement in battery life, the possibility of paging channel extension further complicates the goal of paging channel coordination, i.e., ensuring that paging channels from each of two or more systems with which a subscriber unit is registered do not occur simultaneously.

SUMMARY OF THE INVENTION

The present invention advantageously addresses the needs above as well as other needs by providing an approach for paging reception assurance in a multiply registered wireless transceiver wherein page receipt must be guaranteed in at least one system with which the wireless transceiver is registered.

In one embodiment, the invention can be characterized as a method for selecting an asynchronous paging interval. The method includes steps of selecting a set of possible paging schemes for one wireless system; selecting a paging interval for another wireless system that is asynchronous with the paging schemes selected for the one wireless system; determining, after some number of paging repetitions, the probability of collision between a first paging channel in the one wireless system, and a second paging channel in the other wireless system; reselecting the paging interval for the other wireless system, asynchronous with the paging schemes selected for the one wireless system, and repeating the determining of the probability, until after some number of page repetitions, the probability reaches a prescribed minimum; and reselecting the paging interval for the other wireless system, asynchronous with the paging schemes selected for the one wireless system, and repeating the determining of the probability, until the number of paging repetitions needed to reach the prescribed minimum is reaches a selected minimum.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
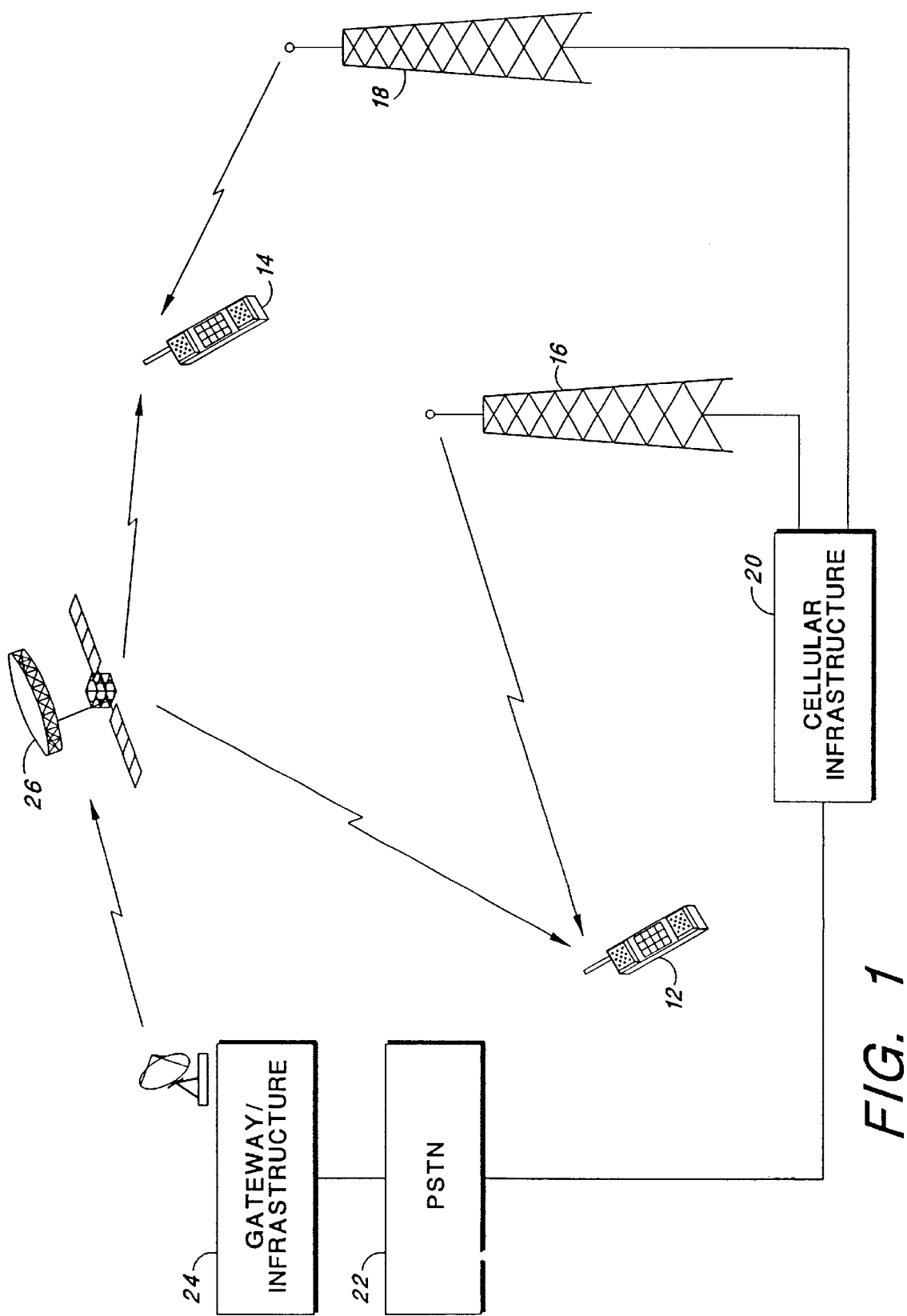
FIG. 1 is a schematic diagram illustrating communications between a multiply registered wireless transceiver and a plurality of wireless communications systems, such as may be used to implement one embodiment of the invention claimed herein.

Referring first to FIG. 1, a block diagram of a multiply registered wireless transceiver (or terminal 12); a second a multiply registered wireless transceiver (or terminal 14); a first cellular base station 16; a second cellular base station 18; cellular infrastructure 20 (or cellular network); a public switched telephone network (PSTN)22; a satellite gateway/infrastructure 24 (or gateway/network); and a satellite link 26.

In operation, when a telephone call is placed through the public switched telephone network 22 to one of the wireless transceivers 12, one of two possible sequences of events will take place. If the call is placed through a telephone number corresponding to the wireless transceiver's cellular service, a telephone call is initiated in a conventional manner between the public switched telephone network 22 and the cellular infrastructure 20. The cellular infrastructure 20 signals a cellular base station 16 with which the wireless transceiver 12 is registered to initiate a page. Typically the wireless transceiver 12 has been assigned a specific paging channel defining both a frequency and a time interval during which the wireless transceiver 12 monitors for page messages from the cellular base station 16. Within this paging channel, the wireless transceiver 12 must be sensitive to incoming pages in order to receive the call. In response to receiving a page message from the cellular base station 16 in its paging channel, the wireless transceiver 12 will signal an operator that an incoming call is present. The operator typically initiates or answers the call by depressing a button on the wireless transceiver 12, thus initiating call set up.

When a call is initiated through the public switched telephone network 22 to the one of the wireless transceivers 12, and the number called through the public switched telephone network 22 is identified as a satellite system number, the call is routed by the public switched telephone network 22 to the gateway (infrastructure 24) that transmits a page message to the satellite link 26 with which the wireless transceiver 12 is registered. As with the cellular system, the wireless transceiver 12 is assigned a paging channel by the satellite system. Thus in addition to monitoring the paging channel assigned to it by the cellular system, the wireless transceiver 12 must also monitor the paging channel assigned to it by the satellite system.

As is the case with most cellular systems, the cellular system depicted is unaware of, and therefore uncooperative with the satellite system. Thus, the cellular system makes no effort to avoid assigning a paging channel to the wireless transceiver 12 that conflicts in time with the paging channel assigned to the wireless transceiver by the satellite system. Furthermore, the cellular system assumes that the wireless transceiver is monitoring the paging channel so long as it is in an idle mode, i.e., no call is set up. Thus, the cellular system does not expect the wireless transceiver to miss pages sent to it by the cellular base station 16 with which it is registered. Thus, it is entirely up to the satellite system to avoid sending its page messages when the wireless transceiver is monitoring the paging channel from the cellular system.

This so-called page collision avoidance is implemented entirely by the satellite system, and is fairly simple when paging channels within a cellular system fall at predictable intervals of which the satellite system is aware. Unfortunately, however, as depicted in FIG. 1, multiple cellular base stations 16, 18 may serve wireless transceivers 12, 14 respectively, both wireless transceiver 12, 14 are serviced by a single satellite link 26. Furthermore, these cellular base stations 16, 18 may employ entirely different and incompatible paging schemes, which may even be asynchronous with one another. For example, in a system known as Global System for Mobile Telecommunications (GSM), which is popular in many European countries, over a few hundred different paging schemes and intervals may be employed in a per-cellular-base-station basis. A wireless transceiver 12 operating within a cell for a particular cellular base station 16 is informed of the particular paging scheme used within that cell by the cellular base station 16 that defines the call. The wireless transceiver 12 receives an indication of this scheme in a broadcast control channel through which it is transmitted by the cellular base station 16. This indication is used by the wireless transceiver 12 to look up in lookup table the paging scheme employed within the cell.

Analysis of the many paging schemes available within the GSM system, in combination with its extended paging capability, described above, reveals that there is no single synchronous paging interval useable by the satellite system that will assure that the satellite paging channel never overlaps with the cellular systems paging channel. Further complicating this is the fact that in order to monitor the cellular systems paging channel, the wireless transceiver must be put into a cellular "mode". This involves loading digital signal processors within the wireless transceiver 12 with cellular programming, including various equalizers, signal processors and other cellular specific subsystems. This loading of the cellular subsystems does not occur instantaneously, and therefore some "lead time" (or "guard time") is necessary before each cellular paging channel for cellular subsystems to be loaded. Similarly, prior to monitoring the satellite paging channel, satellite subsystems must be loaded into the digital signal processors within the wireless terminal 12. As a result, "lead time" (or "guard time") is also required before each satellite paging channel.

Figure 2:
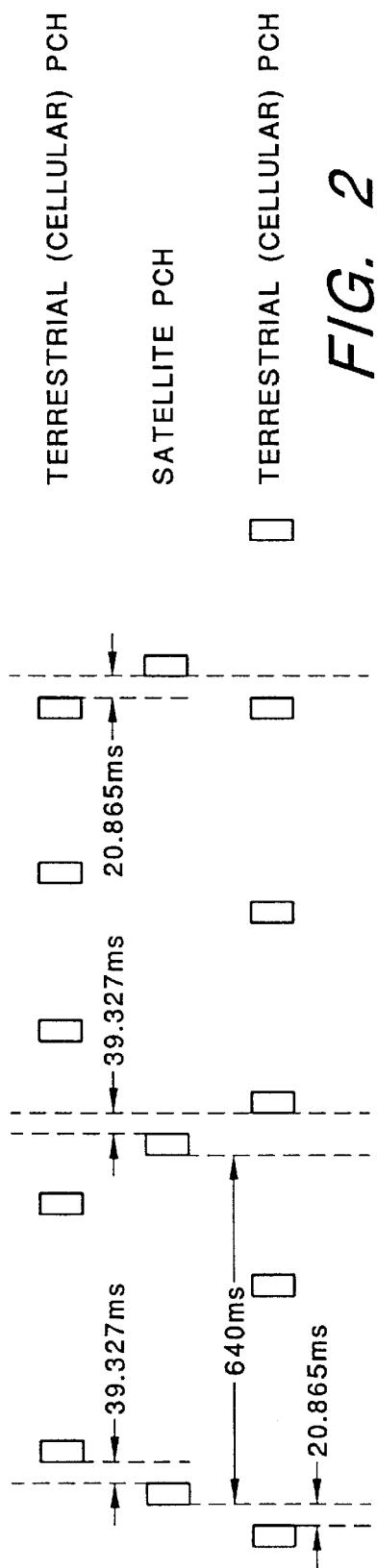
FIG. 2 is a timing diagram showing asynchronous timing relationships between page messages of one wireless system and paging messages of another wireless system, such as the wireless communications systems of FIG. 1.

Referring next to FIG. 2, a timing diagram is shown of an arrangement of cellular paging channels for a first cell that overlaps geographically with an area serviced by a particular satellite link; paging channels for the satellite; and paging channels for a wireless terminal in a second cell also having an overlapping service area with the satellite link. Also shown are times to load the cellular subsystems, in this case 39.327 milliseconds, and times shown to load the satellite systems, in this case 20.865 milliseconds. In accordance with the requirements of the cellular system, the wireless transceiver must monitor the assigned cellular paging channel whenever it is in an idle mode. Given that it is impossible to prevent conflicts with any synchronous satellite paging channel, when a large number of possible paging schemes are selectable by the cellular system, on a cell-by-cell basis, the satellite paging scheme, in accordance with the present embodiment, is selected to be asynchronous with all of the possible cellular paging schemes, and to have a high likelihood of a satellite page message being received within a minimum number of repetitions of the satellite page message. This both conserves paging channel bandwidth, and the speeds call setup in situations where synchronization of paging channels between multiple wireless systems is not possible.

Figure 3:
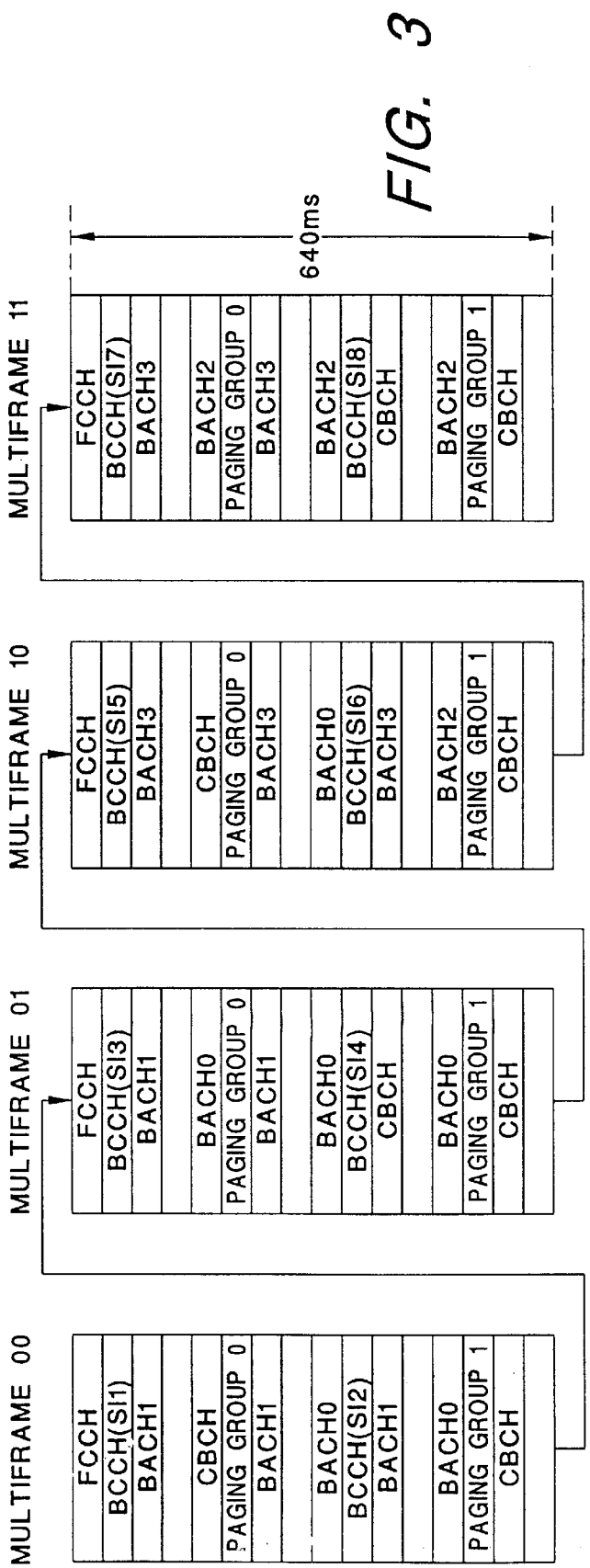
FIG. 3 is a schematic diagram showing a multiframe structure employable in one of the wireless communications systems of FIG. 2.

Referring next to FIG. 3, in accordance with present embodiment, which is employed in conjunction with a GSM system, by organizing satellite paging broadcasts to be scheduled every 640 milliseconds and by repeating each satellite page message three times in consecutive broadcasts, no matter how GSM channels are organized (i.e., which of the multiple GSM paging schemes is selected) in a particular GSM cell to which a wireless transceiver may be registered, the wireless transceiver can receive both the paging channels, i.e., both the satellite system's paging channel and the GSM cellular system's paging channel so as to never miss a GSM page while in idle mode because the wireless transceiver is listening for a satellite system page, conversely, so as to never miss all repetitions of the satellite system page because of its obligation to monitor the GSM paging channel. The present approach works whether the GSM cellular system is using normal or extended paging modes, i.e., when a paging channel extension is indicated and a "next but one" paging channel must be monitored in addition to the wireless transceiver's assigned GSM paging channel.

The present approach is confirmed by simulation as summarized in the following table.

| TOTAL CASES: 396 | | | | | |
|---|---|---|---|---|---|
| Context Switch Time (ms) | 2 | 3 | 40 | 55 | 60 |
| Second Paging Overlap | 26 | 26 | 29 | 39 | 41 |
| Third Paging Overlap | 0 | 0 | 0 | 0 | 2 |
| Second Paging Overlap Probability (%) | 6.56 | 6.56 | 7.32 | 9.85 | 10.35 |
| Third Paging Overlap Probability (%) | 0 | 0 | 0 | 0 | 0.5 |

The simulation involves selecting a set of possible paging schemes for one wireless system, in this case the GSM system, and selecting a paging interval for the other wireless system that is asynchronous with the paging scheme selected for the one wireless system. The selected paging interval is then used in the simulation to determine, based on each member of the set of possible paging schemes and based on possible occurrence of an extended page message, the likelihood of a collision. The objective in selecting the paging interval should be as follows:

1. After some number of paging repetitions, the probability of collision should reach a prescribed minimum, e.g., 0%; and 2. The number of paging repetitions needed to reach this prescribed minimum should be minimized.

In the example depicted in the table, a probability of 0% is achieved with only two repetitions by selecting 640 milliseconds as the paging interval used by the satellite system to be used in conjunction with the GSM cellular system.

Referring back to FIG. 2, by way of example, a demonstration of how satellite system paging and GSM cellular system paging might collide, or occur at the same time is shown. It is important to note that satellite system paging avoidance scheme of the present embodiment must not only account for the 14.4 ms time during which it takes to transmit a GSM page message, but also for a buffer time ("guard time" or "lag time") for context switching in the wireless transceiver, i.e., for loading respective subsystems into a digital signal processor, and switching RF and IF sections to a different operating frequency, and the like.

As shown in FIG. 2, the GSM cellular system is employing normal paging, i.e., there is no overlap or collision of the first and second repeated satellite system pages with the GSM cellular system paging channel for any possible choice of the GSM paging channel parameters. When the GSM cellular system is in an extended paging mode, this situation is not so simple, and further investigation is required. The conclusion is that less than eight percent of the first satellite system pager repetitions overlap with the GSM cellular system paging channel when guard time is less than 40 ms, assuming the original satellite system page was missed because of overlap or collision with a GSM cellular system paging channel. For a 640 millisecond paging interval, overlapping of the first repeated satellite system paging channel, i.e., the second satellite system page, happens only when the GSM page parameter BS_AP_MFRMS=2,3. The second satellite system page repetition, i.e., the third satellite system page, never overlaps with the GSM cellular system paging channel until context switch time exceeds 55 ms.

GSM cellular system paging related parameters in a broadcast control channel that determine how the paging channel in a particular GSM cell is organized include BS_CCCH_SDCCH COMB=false, true; BS_AG_BLKS RES=0, 1, 2, 3; BS_AP MFRMS=2, . . . 9; EX_PCH=false, true. Each GSM cellular system paging channel message occupies four bursts, transmitted over three frames and one time slot. The distance between the paging channel and an extended paging channel message is variable due to the complex frame structure of the GSM control channel, and can be 10, 15, 17, 45, or 47 TDMA frames (one TDMA frame in a GSM cellular system is 4.616 milliseconds). Different cases are given below:

1. The distance between a paging channel and an extended paging channel is ten TDMA frames, which is the typical case, then between a paging channel and an extended paging channel there is only one FCCH, one SCH and one CCCH (common control channel).

2. The distance between the paging channel (frame No. 43) and the extended paging channel is 15 TDMA frames, then when the paging channel is the second to the last CCCH in a multi-frame, the distance to the extended paging channel will be 15 frames.

3. The distance between the paging channel (frame No. 47) and the extended paging channel is 17 TDMA frames, when a paging channel is the last paging channel in a multi-frame (one before the idle frame), the extended paging channel will be transmitted 17 frames later. There are two FCCH, two SCH, and one broadcast control channel and one CCCH and one idle frame between the paging channel and the extended paging channel.

4. The paging channel (frame No. 13) and the extended paging channel is 45 TDMA frames, when the BS_CCCH_SDCCH_COMB parameter is set to true, the SDCCH will be transmitted from 23 frames if a paging channel is in the second next to the first SDCCH, the distance between the paging channel and the extended paging channel will be 45 frames.

5. The distance between the paging channel (frame No. 17) and the extended paging channel is 47 TDMA frames, BS_CCCH_DCCH_COMB parameter is set to true. If a paging channel is the one before the first SDCCH, the extended paging channel will be transmitted 47 frames later. Between the paging channel and the extended paging channel there are six SDCCH/4, five FCCH and SCCH, one BCCH, one CCCH and, one idle frame.

For the above five possible GSM paging structures, the cases of the first satellite system paging channel overlapping with the GSM cellular system paging channel and extended paging channel, whether the second (640 milliseconds) and the third (1,280 milliseconds later) satellite system paging channel overlap with the same GSM cellular system paging channel that includes the paging channel and the extended paging channel. In the satellite system in accordance with the present embodiment, the paging burst is 10 milliseconds, allowing 42, 30, 35, 55 and 60 milliseconds contact switching times between the satellite system and the GSM cellular system idle modes within the wireless transceiver.

While the invention herein disclosed has been described by means of specific embodiments and applications thereof, numerous modifications and variations could be made thereto by those skilled in the art without departing from the scope of the invention set forth in the claims.

What is claimed is:

1. A method for selecting an asynchronous paging interval comprising:

selecting a set of possible paging schemes for one wireless system;

selecting a paging interval for another wireless system that is asynchronous with the paging schemes selected for the one wireless system; and the paging interval has to comply with the multiframe structure employed in another wireless system (FIG. 3) and provides appropriate paging duty cycle to the wireless subscriber;

determining, after some number of paging repetitions, the probability of collision between a first paging channel in the one wireless system, and a second paging channel in the other wireless system for diffrent context switch time;

reselecting the paging interval for the other wireless system, asynchronous with the paging schemes selected for the one wireless system, and repeating the determining of the probability, until after some number of page repetitions, the probability reaches a prescribed minimum; and reselecting the paging interval for the other wireless system, asynchronous with the paging schemes selected for the one wireless system, and repeating the determining of the probability, until the number of paging repetitions needed to reach the prescribed minimum is reaches a selected minimum.

2. The method of claim 1 wherein said selecting a paging interval for said other wireless system comprises selecting a paging interval that is an integral multiple of a frame employed by the other wireless system.

3. The method of claim 1 wherein said selecting of said set of possible paging schemes for said one wireless system comprises selecting a set of possible paging schemes for a terrestrial wireless communications system.

4. The method of claim 1 wherein said selecting of said set of possible paging schemes for said one wireless system comprises selecting a set of possible paging schemes for a cellular communications system.

5. The method of claim 1 wherein said reselecting said paging interval for said other wireless system, and said repeating said determining of said probability, comprise reselecting said paging interval for said other wireless system, asynchronous with the paging schemes selected for said one wireless system, and repeating said determining of said probability, until after no more than three page repetitions, said probability reaches a prescribed minimum.

6. The method of claim 1 wherein said reselecting said paging interval for said other wireless system, and said repeating said determining of said probability, comprise reselecting said paging interval for said other wireless system, asynchronous with the paging schemes selected for saod one wireless system, and repeating said determining of said probability, until after no more than three page repetitions, said probability reaches zero.

7. The method of claim 1 wherein said reselecting said paging interval for said other wireless system, and said repeating said determining of said probability comprise reselecting said paging interval for said other wireless system, asynchronous with said paging schemes selected for said one wireless system, and repeating said determining of said probability, until said number of paging repetitions needed to reach said prescribed minimum is reaches three or less.

8. A system comprising:

a multihomed wireless transceiver;

a first communications network including a predefined set of paging schemes;

a second communications network including a paging interval that, when a page message is sent by the second communications network to the multihomed wireless transceiver in one paging channel and is repeated at the paging interval, assures that upon a predefined number of page repetitions a prescribed minimum probability of both the page message and all of the repeated page messages being missed by the multihomed wireless transceiver, due to monitoring of another paging channel for the first communications network, is achieved.

9. The system of claim 8 wherein said prescribed minimum probability is zero.

10. The system of claim 9 wherein said predefined minimum number of page repetitions is three.

* * * * *